Feb. 19, 1963

I. BARNETT ET AL 3,077,696

MAGNETIC KIT AND RELATED APPARATUS

Filed Jan. 19, 1961

INVENTOR.
IRWIN BARNETT
DONALD WILBUR TRAUB
BY

ATTORNEY

Feb. 19, 1963 I. BARNETT ET AL 3,077,696
MAGNETIC KIT AND RELATED APPARATUS
Filed Jan. 19, 1961 2 Sheets-Sheet 2

INVENTORS
IRWIN BARNETT
DONALD WILBUR TRAUB
BY
ATTORNEY

United States Patent Office 3,077,696
Patented Feb. 19, 1963

3,077,696
MAGNETIC KIT AND RELATED APPARATUS
Irwin Barnett, 534 Richmond Road, and Donald Wilbur Traub, 509 May Lane, both of East Meadows, N.Y.
Filed Jan. 19, 1961, Ser. No. 83,692
4 Claims. (Cl. 46—16)

This invention relates to magnetic devices, and more particularly to magnetic apparatus especially suitable for use in kits and games.

It is an object of the invention to provide an improved and readily manufactured magnetic apparatus and, particularly, a magnetic kit adapted to constitute an educational game or toy.

A further object of the invention is to provide an improved and economically feasible construction set including elements connectable in an inexhaustible number of variations.

Still another object of the invention is to provide improvements in kits which kits are adapted to induce and promote interest in geometrical organization, design, architecture and so forth.

Yet another object of the invention is to provide a construction kit the elements of which are readily engaged and disengaged.

Briefly, to achieve the above and other of its objectives, the invention contemplates the provision of a kit including a variety of geometrically different elements of magnetizable material adapted for being operatively associated in innumerable arrangements, the kit further including a special arrangement of magnets and magnetized members in the form of platforms for supporting the said elements and imparting magnetization thereto.

A feature of the invention, is the provision of means permitting the adjustment of structural and magnetic parameters such as magnetic "air gaps" and the like.

More particularly the invention contemplates the provision of a game comprising physically separate and distinct members of magnetizable material each including vertical and horizontal sections perpendicularly connected with support means being provided which supports these members with the vertical sections in parallel relation. Further there is contemplated the provision of at least one magnet between the aforesaid vertical sections for magnetizing these members of magnetizable material, the magnet being physically separate and distinct from these members. In addition these vertical sections extend through the above noted support means, the horizontal sections and magnet being located on opposite sides of the support means, the horizontal sections further being connected by the vertical sections to the magnet to be of opposite polarity. The support means and horizontal sections are preferably in face-to-face relation. Further toy elements may be provided which are adapted for being magnetically supported on the horizontal sections.

One feature of the invention resides in the fact that since the horizontal sections and magnet are on opposite sides of the associated support means that this assembly is capable of retaining itself in position without further attachment to a container which may be provided therefor.

Another feature of the invention is that the shape and size of the horizontal sections may be substantially more independent of the magnet and magnetic forces required than if the horizontal sections were to be an integral part of the magnet itself.

Still another feature of the invention is that the horizontal sections constituting the magnetizable platforms may be manufactured independently of the magnet and thus a more facile technique is afforded.

Advantageously, the structure provided for by the invention affords a substantial reduction in weight over the type of unit provided by a magnet which integrally incorporates the horizontal platforms for equivalent magnetic strength.

A further advantage of the invention is that the relationship of the platforms to each other and to the source of magnetic force may be made adjustable.

Moreover, it is to be noted that in the event of loss of magnetic strength, it is possible in the structure of the invention to replace the magnet without replacing the magnetizable platforms so that a great advantage thereby inures to the benefit of the invention.

The structure of the invention is of far less bulk than heretofore known structures and thus a plurality of platforms may readily be incorporated into a game when the provisions of the invention are employed.

It is also quite significant that a substantial reduction in cost is afforded when the structure of the invention is employed.

Additionally, it is to be noted that the surfaces of the platform of the invention can be finished differently from the associated magnet and thus a highly polished surface may be employed in games of the invention.

Advantageously, the various structures of the invention are readily fabricated by the use of mass production techniques and with the use of materials of low cost.

Other objects, features and advantages of the invention will become apparent in the following detailed description as illustrated by the accompanying drawing, in which.

According to the invention, there is provided a magnetic construction kit especially suited for use as an educational toy or the like, as will become apparent in the following detailed description. The elements and structures of the kit are susceptible of simple design and manufacturing techniques and consequently kits of the invention are readily and inexpensively manufactured.

Figure 1:
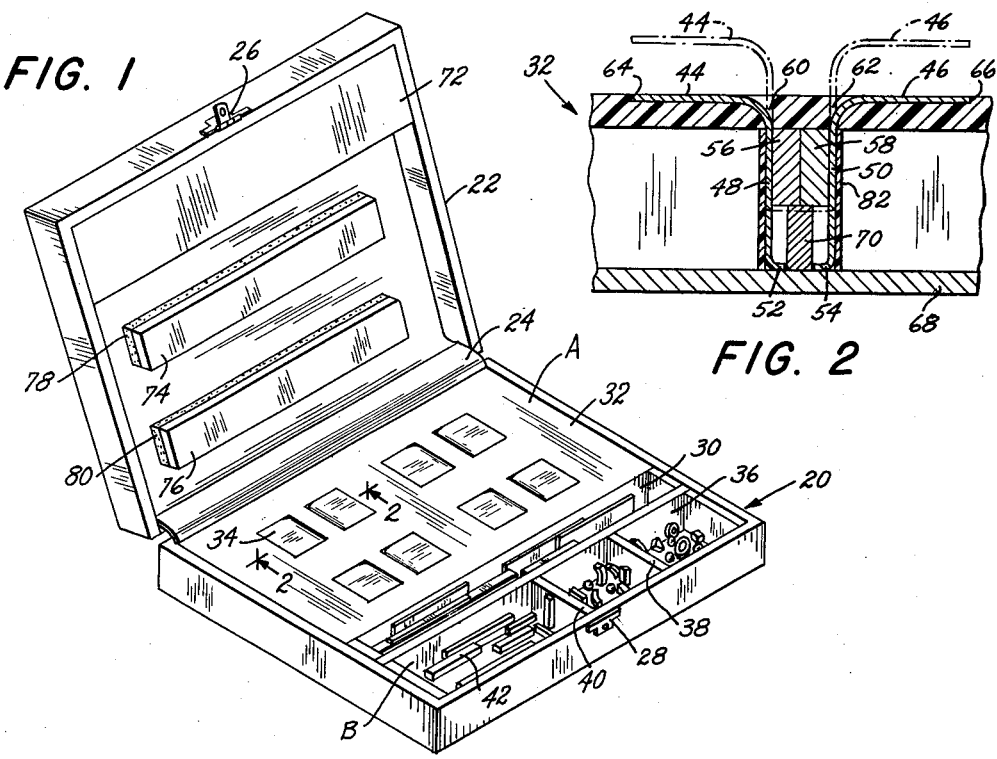
FIG. 1 is a perspective view of a kit provided in accordance with the invention.

The kit illustrated in FIG. 1 comprises generally a casing 20 having a cover 22 connected thereto by means of a hinge member 24. The casing may further be provided with lock elements 26 and 28.

Within the casing 20 is provided a main partition 30 dividing the casing generally into sections A and B.

An inner cover or member 32 closes off the section A and forms a chamber within which is accommodated some of the magnetic elements, as will be explained in greater detail below.

Cover 32 provides a background or support for the platforms 34, which will also be described in greater detail hereinafter.

Additional partitions 36, 38 and 40 divide section B into a number of compartments. These compartments are intended for the accommodation and storage of magnetizable elements 42 which are of a wide variety of different geometrical configurations, the purposes of which will become hereinafter apparent.

Figure 2:
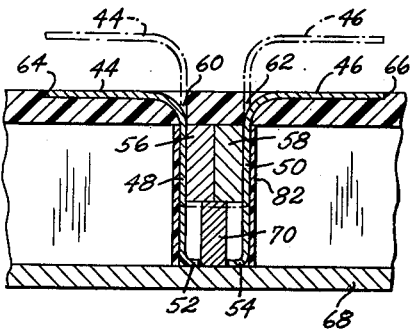
FIG. 2 is a sectional view taken along line 2—2 of FIG. 1.

FIG. 2, which is a sectional view taken along line 2—2 of FIG. 1, illustrates the arrangement of the magnetic supports referred to above as platforms 34 of FIG. 1.

In FIG. 2, these platforms are constituted by diverging horizontal sections 44 and 46 which are displaceable between the positions shown by solid lines and the positions shown by dotted lines.

Horizontal sections 44 and 46 are connected to vertical sections 48 and 50, which are preferably planar members arranged in spaced parallel relation, to constitute physically separate and distinct members of magnetizable material.

Whereas horizontal sections 44 and 46 are connected to the upper extremities of vertical sections 48 and 50, horizontal sections 52 and 54 are connected to the lower extremities thereof and are inwardly directed towards one another, these latter sections limiting the vertical displacements of sections 48 and 50, as will be discussed hereinunder.

Between and physically separate and distinct from vertical sections 48 and 50 are accommodated one or more permanent magnets, preferably of the wafer type. Two generally box-shaped magnets 56 and 58 are illustrated, these magnets being of a commercially available type. Magnets 56 and 58 are suitable for magnetizing or establishing magnetic fields in the angle members which are constituted respectively by sections 44, 48 and 52, and 46, 50 and 54.

The inner cover 32 (see also FIG. 1) defines for each pair of angles a slot 60 and 62 through which may slidably extend vertical sections 48 and 50. In cover 32 these slots are preferably arranged in parallel and in two parallel rows and are further preferably arranged in pairs to accommodate the two magnetized platforms or horizontal sections 44 and 46 associated with each source of magnetic force such as constituted, for example, by magnets 56 and 58. Further, cover 32 is preferably provided with recesses 64 and 66 so that the upper surfaces of platforms 44 and 46 have a position of rest which is flush with the upper surface of cover 32.

Magnets 56 and 58 are preferably of a height which is less than the distance between cover 32 and bottom 68 of the casing 20. To maintain the magnets in position against cover 32, there is provided a block or spacer 70 which extends from bottom 68 to the bottom of said magnets.

Block 70 is preferably of a width which is less than that of the cumulative width of magnets 56 and 58. This provides for the accommodation of inwardly directed horizontal sections 52 and 54, such that block 70 constitutes a guide for the same. It will be noted that the height of block 70 constitutes the amount by which platforms 44 and 46 can be raised above inner cover 32, inasmuch as horizontal sections 52 and 54 constitute hooks which engage against the bottoms of magnets 56 and 58 to prevent a detachment of platforms 44 and 46 from the casing.

Referring again to FIG. 1, it will be noted that the cover 22 of the casing 20 is provided with a built up section 72, the purpose of which is to close off the compartments formed in section B by partitions 36–40. Thus, when the cover is closed, it is impossible for elements 42 to fall out of the compartments irrespective of the attitude of casing 20.

Moreover, it will be noted that the keeper elements 74 and 76 are provided on the cover 22, these keeper elements being supported on rubber foundations 78 and 80 which provide for a yieldable engagement of keeper elements 74 and 76 with platforms 34 when the cover 32 is closed. Keeper elements 74 and 76 are intended to maintain magnets 56 and 58 at high efficiency for prolonged periods and are conveniently disposed on cover 22 so as to be moved into position automatically when the cover 22 is moved to closed position.

Returning briefly to FIG. 2, it is to be noted that the structure consisting of vertical sections 48 and 50 and magnets 56 and 58 is encased in a box or guide member 82 which sandwiches the vertical sections against the magnets in a manner which permits a sliding movement of the vertical sections with respect thereo. Guide members 82, which may be of plastic, are intended to keep the vertical sections constantly in a regular vertical attitude while permitting, nevertheless, a movement of the horizontal sections 44 and 46, as discussed above.

Figure 3:
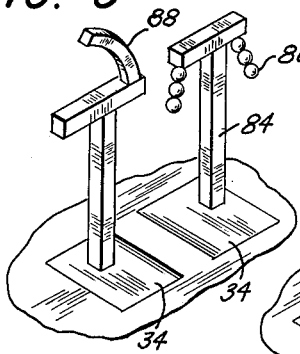
FIGS. 3–5 illustrate some simple structures formed with elements provided in accordance with the invention and illustrating certain magnetic principles.
Figure 4:
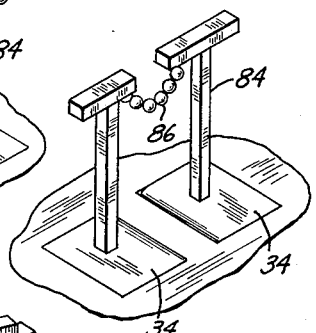
Figure 5:
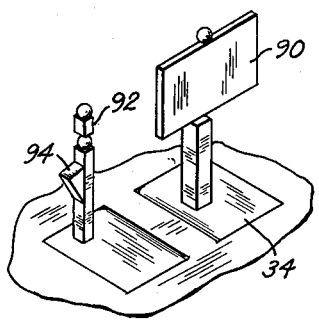

FIGS. 3–5 illustrate some of the magnetizable constructional elements of the invention. Among these constructional elements, for example, are the columnar elements 84, the spherical elements or balls 86, the arcuate elements 88, the plate elements 90, the cube elements 92 and the triangular elements 94.

FIG. 3 illustrates two columnar elements 84 supported in parallel on platforms 34, two further columnar elements being employed to form T-shaped structures on one of which is magnetically supported an arcuate element 88 and on the other of which is supported two chains of spheres 86, all of these elements being of magnetizable material and being held together by magnetically attractive forces.

The diverging connection of the chains of spheres 86 indicates the play of the magnetic forces in this structure.

In FIG. 4 platforms 34 which are oppositely polarized support two T-structures of columar elements 84 between which is suspended a chain of spheres 86.

FIG. 5 further illustrates the use of plates 90, cube-like elements 92 and triangular elements 94.

It will be readily appreciated that the structures demonstrated above are relatively simple structures which are exemplary rather than comprehensive of the variations which may be embodied with the use of the constructional elements of the invention.

Figure 6:
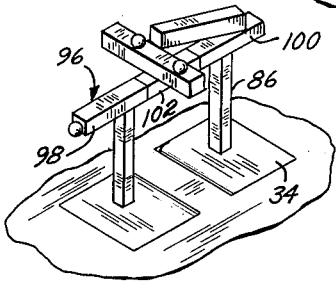
FIG. 6 illustrates a special constructional element provided in accordance with the invention.

FIG. 6 illustrates a modification of the constructional elements described heretofore in that there is provided a bridge member or separator stick 96 consisting of two sectors 98 and 100 of magnetizable material connected by means of a non-magnetic sector 102 fabricated, for example, of brass or aluminum, or perhaps a plastic.

With respect to bridge member 96, it will be appreciated that if platforms 34 and columnar elements 86 were to be magnetized and the member 96 were of completely magnetizable material, rather than including sector 102 as illustrated, a complete magnetic circuit would be formed through said member 96. This would make minimum the magnitude of magnetic force available for magnetically attaching constructional elements thereto and this might, under certain circumstances, not be desirable. To this end, at least one bridge member 96 is provided in the kit to afford a mechanical bridge which does not, at the same time, constitute a magnetic bridge. The use of bridge 96 permits elements to be supported magnetically and gravitationally thereupon, while at the same time permitting the continued existence of strong magnetic forces in sectors 98 and 100 from which these magnetic forces can be tapped as demonstrated, for example, by the spheres on bridge member 96.

Figure 7:
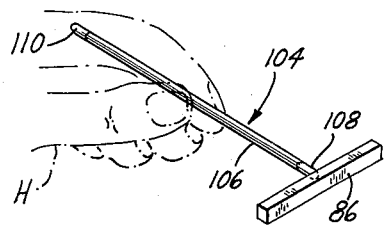
FIG. 7 illustrates a transporting member provided by the invention and adapted for being employed as a constructional element.

FIG. 7 illustrates a further feature of the invention in the form of a transporting stick which enables the manipulating and positioning of construction elements of the invention.

In FIG. 7 stick 104, held by hand H, consists, for example, of a plastic rod 106 supporting a magnetic element 108 and having at its other end an element 110 which is non-magnetic but which is of magnetizable material.

Advantageously, a plurality of sticks 104 is provided in a kit of the invention since these sticks can be employed as structural components placed in end to end relationship.

It will be readily appreciated, however, that the primary function of each stick 104 is to serve as a transporting or conveying mechanism, a construction element such as columnar element 86 being attracted to magnetic tip 108 and being thence conveyed to the position desired therefor.

It is to be noted that tip 108 is preferably of a magnetic strength which is less than that of magnets 56 and 58 (FIG. 2) so that when a constructional element is positioned, the stick 104 may be readily drawn away from the same.

Figures 8, 9:
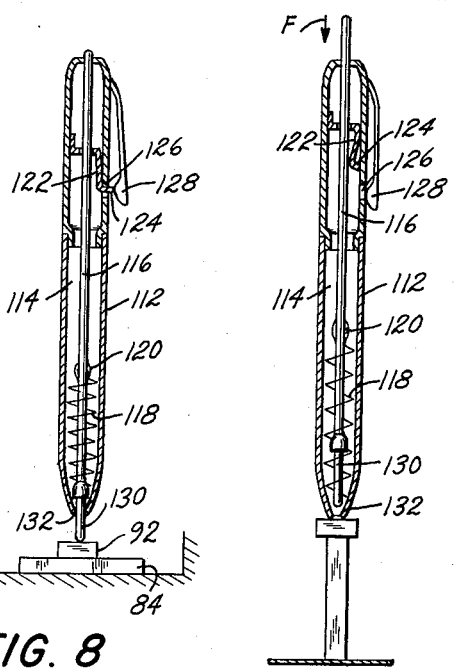
FIG. 8 is a sectional view through a transporting member provided with a retractable magnetic element in accordance with the invention.
FIG. 9 is a sectional view similar to that of FIG. 8, illustrating the magnetic element retracted.

FIGS. 8 and 9 illustrate a further feature of the invention providing for the conveyance and positioning of constructional elements.

In these figures is seen an elongated casing 112 having a longitudinal bore 114 extending therethrough.

Extending through the bore is a rod 116, which may be solid or hollow, preferably of a non-magnetic material.

A spring 118 mounted within casing 112 engages rod 116 by means of lugs 120 on said rod. Spring 118 operates to urge rod 116 upwardly through bore 114.

Frictionally mounted on rod 116 is a spring clip 122 having an end 124 adapted to spring outwardly through hole 126 when appropriately positioned. Spring clip 128 is intended to provide for suitably clipping the device to a support such as a shirt pocket or the like and is additionally intended to force end 124 back into hole 126 whereby the spring 118 is effective to urge rod 116 to assume the position illustrated in FIG. 9.

In the lower terminal portion of rod 116 is accommodated magnetic element 130. Magnetic element 130 is intended to be extended and retracted with respect to opening 132 at the bottom of casing 112, this opening being substantially of the same size as said element 130.

When element 130 is extended, it is adapted to attract elements such as cube 92 and columnar element 84, illustrated in FIG. 8, so that the same may be withdrawn from the compartment 134 formed as aforesaid in the casing 20 (FIG. 1).

When magnetic element or tip 130 is withdrawn through opening 132, any object attached thereto will generally be of too large a size to enter said opening. This separates the tip from the constructional element previously attached thereto whereupon the latter will be deposited, such as illustrated in FIG. 9.

Generally, to operate the structure of FIGS. 8 and 9, a force F is applied to the end or upper extremity of rod 116, thereby carrying end 124 along to a position whereat it opposes hole 126 and springs outwardly therethrough, thus locking rod 116 in position against the upwardly directed force of spring 118.

When subsequently it is desired to cause rod 116 and thus magnetic tip 130 to return to inoperative position, clip 128 is brought to bear against end 124 whereupon opposition to the force of spring 118 is removed and the rod 116 returned to inoperative position as illustrated in FIG. 9.

Figure 10:
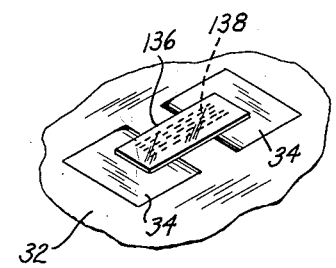
FIG. 10 illustrates a part of the kit contemplated for purposes of illustrating a flux pattern according to the invention.

FIG. 10 illustrates still a further feature of the invention whereby a transparent envelope 136 is provided, this envelope being used to house a multitude of iron filings or particles of other such magnetizable material as will demonstrate an existing flux pattern or magnetic field. In FIG. 10 transparent envelope 136 and the filings therein are being employed to illustrate the flux pattern developing between two adjacent platforms 34. It will be appreciated, however, that envelope 136 is readily transported to any position desired in order to demonstrate a flux pattern existing at any selected position for educational purposes or the like.

Figure 11:
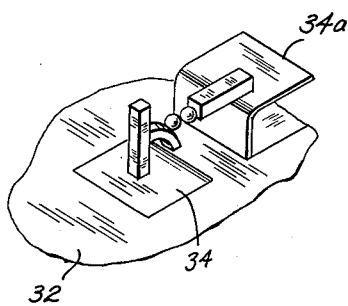
FIG. 11 illustrates a feature of the invention whereby magnetic supports are displaced relative to one another.

FIG. 11 illustrates one platform displaced to a position 34a with respect to the other platform. This enables a variation in air gap in the associated magnetic circuit and can be used for structural purposes and to demonstrate the effect of incorporating air gaps of different length into a magnetic circuit.

Figure 12:
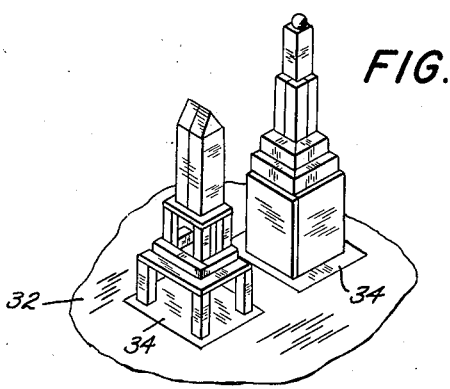
FIG. 12 illustrates a relatively more sophisticated structure which can be provided with the kit of the invention as compared with the structures indicated above.

FIG. 12 illustrates one of many more sophisticated structures which can be formed with the kit of the invention.

According to the invention, as discussed above, there is provided an improved magnetic apparatus especially adapted for constituting an educational game or toy and inclusive of elements connectable in an inexhaustible number of variations. The kit of the invention is especially adapted to induce and promote interest in geometrical organization and design and employs elements which are readily engaged and disengaged without the use of special fasteners or the like.

There will now be obvious to those skilled in the art many modifications and variations of the structure and techniques set forth above. These modifications and variations will not depart from the scope of the invention, however, if defined by the following claims.

What is claimed is:

1. A game comprising physically separate and distinct members of magnetizable material each including vertical and horizontal sections perpendicularly connected, support means supporting said members with the vertical sections in parallel relation, at least one magnet between the vertical sections for magnetizing said members, said magnet being physically separate and distinct from said members, said vertical sections extending through said support means, said horizontal sections and magnet being on opposite sides of said support means, said horizontal sections being connected by said vertical sections to said magnet to be of opposite polarity, said support means and horizontal sections being in face-to-face relation and toy elements adapted for being magnetically supported on said horizontal sections.

2. A game as claimed in claim 1 wherein said support means defines parallel slots through which said vertical sections extend.

3. A game comprising physically separate and distinct members of magnetizable material each including vertical and horizontal sections perpendicularly connected, support means supporting said members with the vertical sections in parallel relation, and at least one magnet between the vertical sections for magnetizing said members, said magnet being physically separate and distinct from said members, said vertical sections extending through said support means, said horizontal sections and magnet being on opposite sides of said support means, said horizontal sections being connected by said vertical sections to said magnet to be of opposite polarity, said support means and horizontal sections being in face-to-face relation.

4. A game comprising a member of magnetizable material including vertical and horizontal sections perpendicularly connected, support means supporting said member, a magnet engaging said vertical section for magnetizing the same, said magnet being physically separate and distinct from said member, said vertical section extending through said support means, said horizontal section and magnet being on opposite sides of said support means, said horizontal section being connected by said vertical section to said magnet to be polarized by the latter, said support means and horizontal section being in face-to-face relation, and toy elements adapted for being magnetically supported on said horizontal section.

References Cited in the file of this patent

UNITED STATES PATENTS

| | | |
|---|---|---|
| 1,535,035 | Philipp | Apr. 21, 1925 |
| 1,804,927 | Gilbert | May 12, 1931 |
| 1,862,558 | Wetzel | June 14, 1932 |
| 2,036,076 | Phillippi | Mar. 31, 1936 |
| 2,321,570 | Billing | June 15, 1943 |
| 2,547,990 | Willms | Apr. 10, 1951 |
| 2,767,517 | Hooper | Oct. 23, 1956 |
| 2,853,830 | Herzog | Sept. 30, 1958 |